United States Patent [19]

Innes et al.

[11] Patent Number: 5,220,478

[45] Date of Patent: Jun. 15, 1993

[54] APPARATUS FOR DISPLAYING THERMAL CONDITION OF MOTOR CONTROLLER

[75] Inventors: Mark E. Innes, Asheville; Rick A. Hurley, Fletcher, both of N.C.

[73] Assignee: Westinghouse Electric Corp., Pittsburgh, Pa.

[21] Appl. No.: 686,959

[22] Filed: Apr. 18, 1991

[51] Int. Cl.$^5$ .............................................. H02H 7/08
[52] U.S. Cl. ........................................ 361/93; 361/25; 340/643
[58] Field of Search .................... 361/93, 94, 114, 187, 361/25; 364/483; 340/588, 589, 593, 643, 664, 655

[56] References Cited

U.S. PATENT DOCUMENTS

| | | | |
|---|---|---|---|
| 4,466,042 | 8/1984 | Zylstra et al. | 340/664 |
| 4,559,530 | 12/1985 | Ishigure et al. | 340/664 |
| 4,767,420 | 7/1988 | Saletta et al. | 361/187 |
| 4,827,369 | 5/1989 | Saletta et al. | 361/93 X |
| 4,875,152 | 10/1989 | Foster | 340/664 |

*Primary Examiner*—Steven L. Stephan
*Assistant Examiner*—E. To
*Attorney, Agent, or Firm*—M. J. Moran

[57] ABSTRACT

A method and apparatus for remotely displaying information about heat in a motor having an associated motor-starting contactor with an overload relay system is provided. The apparatus includes a suitably programmed microprocessor which obtains a signal representative of current in the motor, squares the current and multiplies by time. This actual $I^2t$ value is then used to calculate a signal representative of a relationship between the actual $I^2t$ value and a target value at which the contacts of the motor-starting contactor will open due to an overload current situation. This relationship is preferably a percentage which is then displayed on either an LED bar type display or a digital display. The display may also include a "trip" indicator and a "reset allowed" indicator.

6 Claims, 4 Drawing Sheets

APPARATUS FOR DISPLAYING THERMAL CONDITION OF MOTOR CONTROLLER

BACKGROUND OF THE INVENTION

1. Field of the Invention

This invention relates to motor starting contactors with an overload relay system and, more specifically, the invention relates to an apparatus and method for displaying certain conditions of the motor controller and the associated motor.

2. Background Information and Description of the Prior Art

Electromagnetic contactors are switch devices which are especially useful in motor-starting, lighting, switching and similar applications. A motor-starting contactor with an overload relay system is often called a motor controller. A contactor usually has a magnetic circuit which includes a fixed magnet and a movable magnet or armature with an air gap therebetween when the contactor is opened. An electromagnetic coil which is controllable upon command interacts with a source of voltage which may be interconnected with the main contacts of the contactor for electromagnetically accelerating the armature towards the fixed magnet, thus reducing the air gap. The armature has a set of bridging contacts, the complements of which are fixedly disposed within the contactor case for being engaged by the movable contacts as the magnetic circuit is engaged and the armature is moved. The load and voltage source therefor are usually interconnected with the fixed contacts and become interconnected with each other as the bridging contacts make with the fixed contacts.

When the system is used as a motor controller with an overload relay device, the overload relay function senses current which is related to the input current being drawn by the motor. This then is provided to an electromagnetic or electrothermal device calibrated to cause the main contacts to open under certain overload current situations. Additionally, raw data concerning the current is supplied to a microprocessor. Typically, the microprocessor calculates the heat generated in the motor by calculating current squared multiplied by time, or $I^2t$. It is necessary when supplying the current to a microprocessor that it be converted from an analog to a digital signal for effective utilization by the microprocessor. An apparatus for use with an electromagnetic contactor and the background information concerning an exemplary electromagnetic contactor is provided in U.S. Pat. No. 4,757,420 issued Jul. 12, 1988 and which is assigned to the assignee of the present invention.

As discussed in the U.S. Pat. 4,757,420 the current is measured and a representative signal is generated for input to the microprocessor. As mentioned above, prior to supplying this signal to the microprocessor it is necessary to convert the analog representation thereof to a digital signal for effective utilization by the microprocessor. The microprocessor thereafter performs various calculations in order to determine from the current representative input signal, the heat in the associated motor. This value is then used to communicate with the motor controller to open the contacts of the motor controller in overload current situations or for other purposes within the system. An operator of the system, however, does not have a convenient way of determining the status of the system at any particular point. For example, the operator does not know whether the system is near a trip condition because the operator has no direct information about the thermal condition of the motor. Thus, the only indication of the thermal condition that the operator has is when the motor controller trips in response to a current overload situation. If the operator were aware of the current status of the thermal condition of the motor, the operator could take steps to avoid an early trip of the motor controller. In other words, an operator who is activating a motor starter in order to effectuate a particular task could slow the activations down or space them apart at greater time intervals in order to allow a further cooling of the motor between activations. At present, there is no method by which an operator can visually check the system to determine the status. There remains a need, therefore, for a device which would allow an operator to visually check the status of the motor controller and the associated motor in order to control activation of the system to more efficiently operate the motor and the motor starter.

In addition, after a motor has tripped, typically a safety feature is built into the motor controller such that it cannot be reset until the motor cools down to a certain percentage of the trip value. The operator, however, is not aware of the degree of cooling within the motor. This means that the operator would simply continue to press a reset button until the device resets. There remains a need for a device which indicates whether a reset is allowed which would thereby indicate that the motor has cooled to a sufficient temperature to allow operation thereof after a trip condition has occurred. There remains a further need for a device which indicates that a trip has in fact occurred and a device which indicates that the system is ready to be reset and thereby reactivated.

SUMMARY OF THE INVENTION

These and other needs are satisfied by the device of the present invention in which a method and apparatus is provided for remotely displaying information about the thermal condition of a motor and the status of the associated motor-starting contactor. An associated microprocessor is suitably programmed, as stated above, to perform calculations to determine the thermal condition in the motor. More specifically, the microprocessor is programmed to generate a signal which is the square of the current multiplied by time. This is an actual signal representative of the heat in the motor at a particular instant in time. In accordance with the present invention, the microprocessor is additionally suitably programmed to determine a relationship between this actual signal and a target trip amount. In a preferred embodiment of the invention, the relationship is determined to be the actual signal as a percentage of the target value. This percentage signal is then converted into an appropriate bit pattern and correspondingly displayed on preferably a LED bar type display which ranges vertically from 0% at the bottom of the bar display to 100% at the top of the display. An operator can visually check the display device to determine the percentage value and if, for example, it is determined that the system is operating at a percentage approaching the trip condition, then the operator can make adjustments in the activation of the motor-starter to thereby more efficiently operate the system.

In accordance with another embodiment of the invention, an indicator light is provided to notify the operator that the motor-starting contactor has tripped in response to a current overload condition. Additionally, an indicator light can be provided which informs the operator that a reset of this system is allowed once the system has cooled after a trip to an appropriately lower temperature in accordance with safety considerations.

BRIEF DESCRIPTION OF THE DRAWINGS

A full understanding of the invention can be gained by the following description of the preferred embodiments when read in conjunction with the accompanying drawings in which.

DESCRIPTION OF THE PREFERRED EMBODIMENTS

Figure 1:
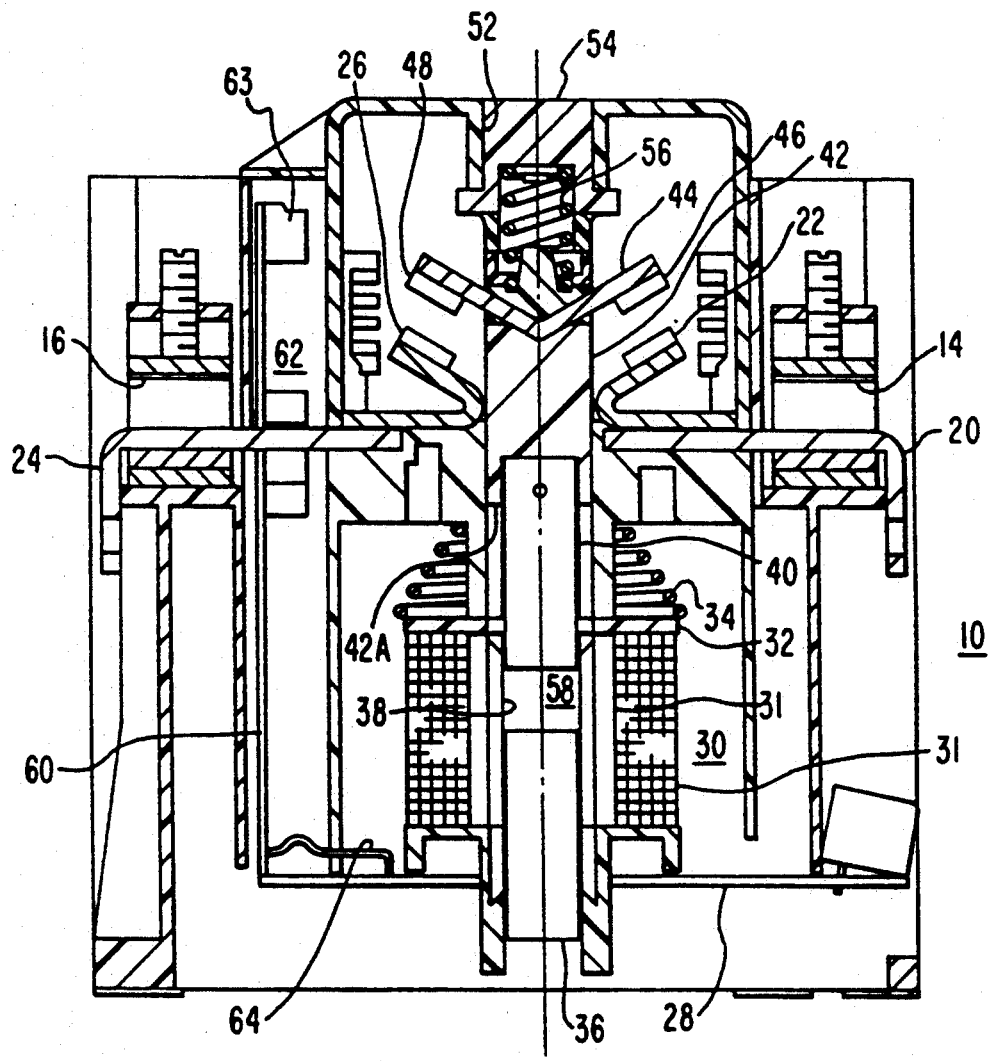
FIG. 1 is a cross section of a typical electromagnetic contactor with which the teachings of the present invention can be used.

Referring to FIG. 1, a prior art motor contactor is shown in order to provide the background for the disclosure of the present invention. Further details about the system are set forth in the U.S. Pat. No. 4,757,420. A cross section of a three phase electrical contactor or controller 10 is shown in FIG. 1. For purposes of simplicity of illustration the construction features of only one of the three poles will be described and it should be understood that the other two poles are the same. Contactor 10 has terminals 14 and 16 for interconnection with an electrical apparatus, or a circuit or a system to be serviced or controlled by the contactor 10. Terminals 14 and 16 are spaced apart and interconnected internally with conductors 20 and 24 respectively. Conductors 20 and 24 are terminated by appropriate fixed contacts 22 and 26, respectively. Interconnection of contacts 22 and 26 will establish circuit continuity between terminals 14 and 16 and render the contactor 10 effective for conducting electrical current therethrough.

A separate coil control board 28 is securely disposed within the housing of contactor 10. Coil control board 28 includes a coil or solenoid assembly 30 which may include an electrical coil or solenoid 31. Spaced away from the coil control board 28 and forming one end of the coil assembly 30 is a spring seat 32 upon which is securely disposed one end of a kickout spring 34. The other end of kickout spring 32 resides against base 12 until movement of a contact carrier 42 causes bottom portion 42A to engage spring 34 and compress it against seat 32.

A fixed magnet 36 is strategically disposed within a channel 38 which is radially aligned with the solenoid or coil 31. Axially displaced from the fixed magnet 36 is a movable armature 40 which is movable in the channel 38 relative to the fixed magnet 36. At the end of the armature 40 and spaced away from the fixed magnet 36 is the longitudinal extending electrically insulating contact carrier 42 upon which is disposed an electrically conducting contact bridge 44. Contact 46 is disposed on one radial arm of contact bridge 44 and on another radial arm of contact bridge 44 is a disposed contact 48. Contact 46 abuts contact 22 and contact 48 abuts contact 26 when a circuit is internally completed between the terminal 14 and 16 as contactor 10 closes. This occurs with electrical energization of the coil or solenoid 31 by electrical power provided at an externally accessible terminal (not visible in FIG. 1). This energization could be in response to a contact closing signal available externally at the externally accessible chamber. This generates a magnetic flux path through fixed magnet 36, the air gap 58 and armature 40. As is well known to those skilled in the art, such a condition causes the armature 40 to longitudinally move within channel 38 in an attempt to shorten or eliminate air gap 58 and to eventually abut magnet 36. This movement is in opposition to, or is resisted by, the force of compression of kickout spring 34 in initial stages of movement and is further resisted by the force of compression of the contact spring 56 after the contacts have been closed.

Also enclosed within the contactor 10 is a overload relay printed circuit board 60 upon which are disposed current sensors which may be current-to-voltage transducers or transformers 62. The information sensed is utilized advantageously in a manner described hereinafter for providing useful circuit information for the contactor 10.

Figure 2:
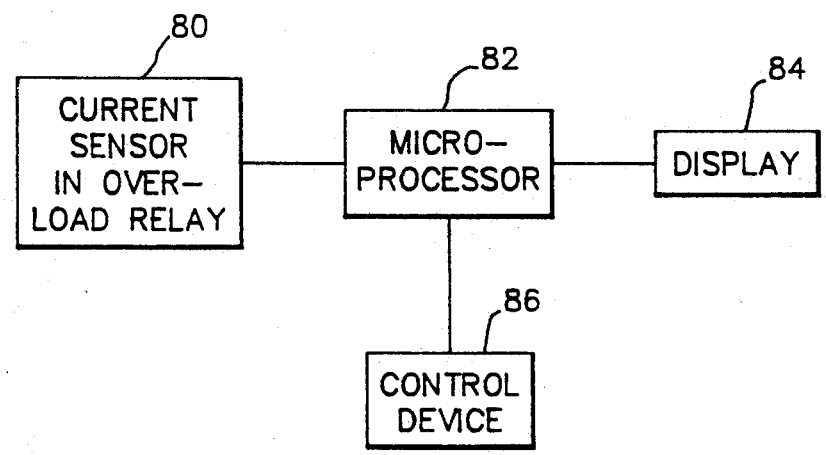
FIG. 2 is a block diagram of the microprocessor and its connections between the overload relay and the device for displaying the information in accordance with the present invention.

More particularly and referring additionally to FIG. 2, current sensor 80 of the overload relay circuit board generates a signal representative of the current in the motor starting contactor and this signal is the input signal to microprocessor 82. Microprocessor 82 would include an analog to digital converter as discussed in detail in U.S. Pat. No. 4,757,420 or it may include any conventional analog to digital converter known to those skilled in the art. This would convert the analog current sensor signal to a digital signal usable by the microprocessor. The microprocessor is suitably programmed in a manner understood by those skilled in the art to perform the following calculation: as each sample of current is obtained from sensor 80 the current signal is squared and multiplied by the time elapsed in taking the current sample to generate an $I^2t$ signal. This $I^2t$ signal is the actual value of heat in the motor controller at that instant in time. The microprocessor would also be programmed to have stored in memory a target value for $I^2t$ appropriate to the system being used and the application in which it is being used. In accordance with the present invention the microprocessor is programmed to determine a relationship between the actual value of $I^2t$ and the target value. This percentage is then the output signal which is then used for display 84.

Figure 3:
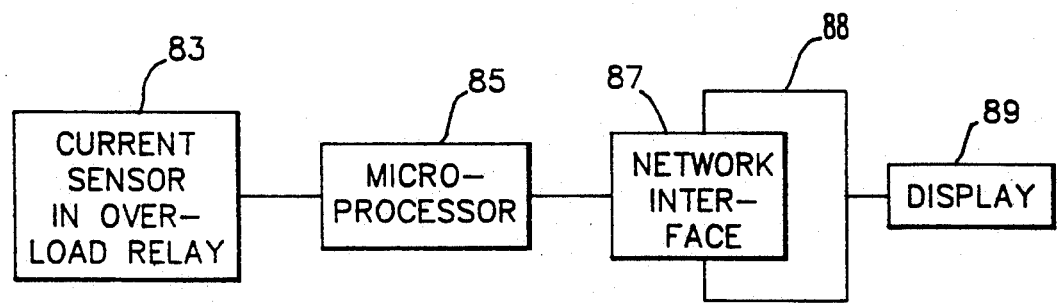
FIG. 3 is a block diagram of the display system of the present invention, using a network interface and a remote display device.

Either the overload microprocessor may be used to perform the calculation in accordance with the present invention, or the information could be transmitted by the overload microprocessor to another microprocessor based unit and that unit may then perform the calculation and drive the display. More specifically, referring to FIG. 3, the current sensor in the overload relay 83 transmits the raw data regarding the current drawn by the motor to the microprocessor 85 as discussed above. Microprocessor 85 performs the $I^2t$ calculations. In this embodiment of the invention, however, it is desired to remotely display the percentage information. Thus, a microprocessor in a network interface 87 is used to perform the calculation of the relationship between the actual signal and the target value. This network interface unit 87 is then used to drive an associated display device 89 as discussed in greater detail below.

As discussed further hereinafter, display 84 (FIG. 2) also contains appropriate circuitry to conform the digital signal of the $I^2t$ percentage into a bit pattern suitable to illuminate the various segments of a display device appropriate to display an understandable reading. In addition, the signal generated by the microprocessor may also be used to activate an associated control device 86 which may be an electromagnetic or an electrothermal device which forces contacts 44 and 48 opened in the event of a current overload situation.

Figure 4:
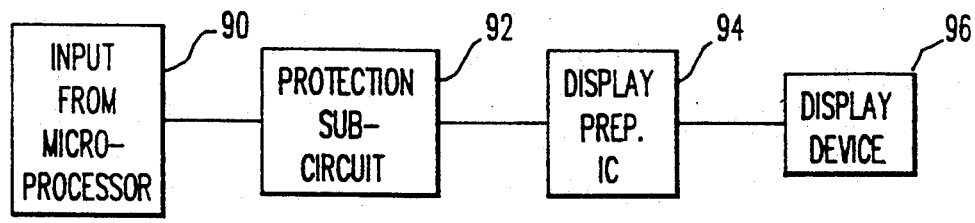
FIG. 4 is a block diagram of the display circuit in accordance with the present invention.

Referring now to FIG. 4, a block diagram of the circuit for preparing the display signal is shown. Input device 90 receives the signal from the microprocessor as a digitized signal for driving the display. This input may be protected if desired by suitable input protection circuit 92 which may contain several subcircuits including suitable resistor-diode-capacitor combinations as would be understood by those skilled in the art. A protected signal is then directed to an integrated circuit 94 which may be an MC14489 integrated circuit available from Motorola, Inc. of Schaumburg, Ill. which prepares the suitable bit pattern depending upon the value of the input to input device 90. The circuit 94 generates an appropriate signal for input to the various input ports of a suitable display device 96 which may either be an LED bar type display which displays the percentage signal in a bar graph configuration or a digital display. In the case where device 96 is an LED bar display the appropriate number of lights are illuminated to reflect the percentage of the target value of $I^2t$. For example, if few lights are illuminated, this means that a low percentage of the target $I^2t$ value exists and the operator at that stage need not take further action. If, on the other hand, many of the lights are illuminated, this shows that the $I^2t$ value is approaching the target and the operator may then decide to take appropriate action. If all of the lights are illuminated, this indicates a trip situation.

Additionally, display 96 may contain two separate LED's (not shown in FIG. 4). The first LED is a trip indicator which lights when the actual $I^2t$ signal from the input 90 is 100% of the target signal which indicates that a trip condition has been reached. Additionally, a second LED can be provided as part of display 96 which is illuminated when the motor has cooled a sufficient amount such that a reset of the system is appropriate. As would be understood by those skilled in the art, the motor controller is preset to trip at a particular $I^2t$ value. It cannot thereafter be reset until the $I^2t$ value falls to at least a certain percentage of the trip value as dictated by safety concerns. A typical value may be about 50% of the total $I^2t$ trip target value. The second LED is illuminated when the $I^2t$ value reaches the predetermined safe reset position such as, for example, 50%. This informs the operator that a reset of the system may proceed and the operator would then activate an associated reset button to reactivate the equipment.

Figure 5:
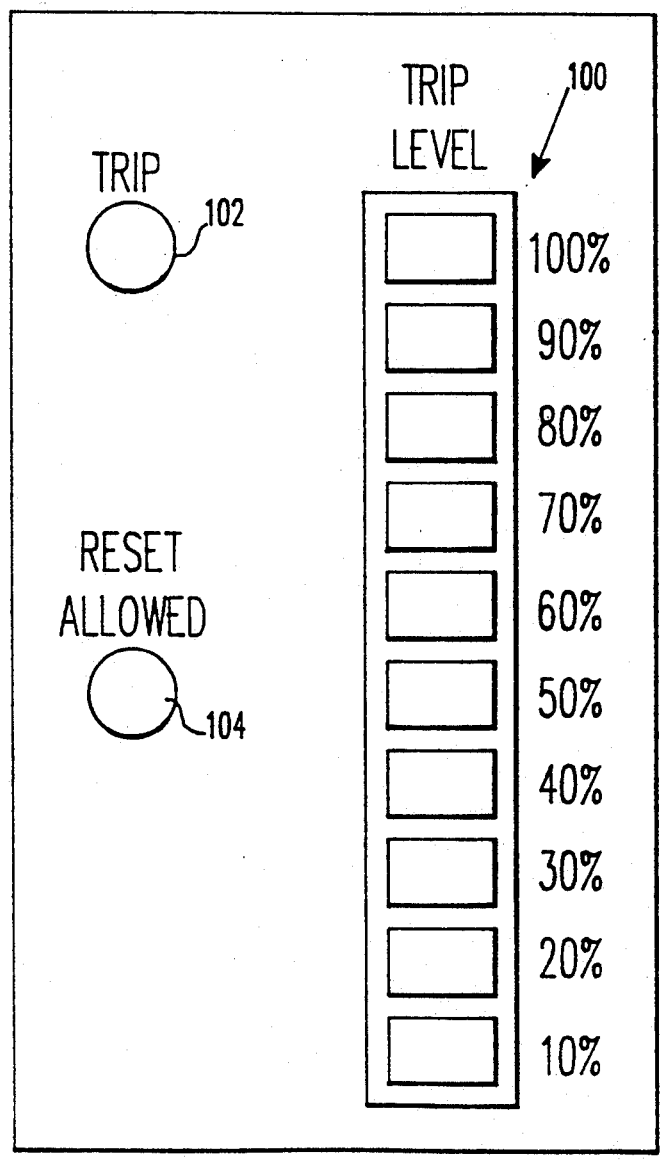
FIG. 5 is an exemplary display panel in accordance with the method and apparatus of the present invention.

Referring to FIG. 5, an example of a display panel in accordance with the present invention is shown. An LED bar graph display 100 is shown in the embodiment of the FIG. 4 and the percentages are indicated on the right hand side of the bar graph 100. The "TRIP" indicator light 102 provides information to the operator that the motor contactor has tripped. The "RESET ALLOWED" light 104 indicates that the system has returned to a condition under which reset is allowed and further operation can thereafter continue.

Figure 6:
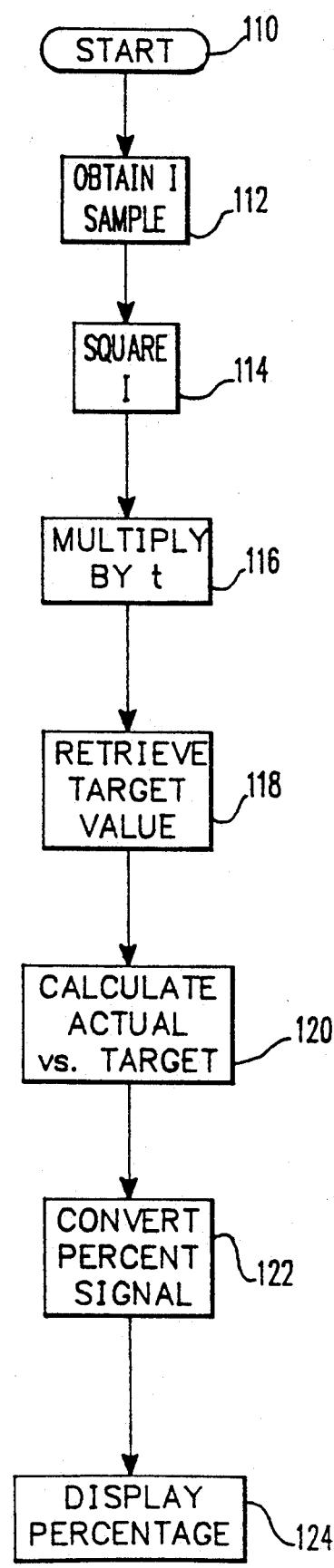
FIG. 6 is a flow chart of the method of the present invention.

A flow chart describing the method of the present invention is shown in FIG. 6. The program of the microprocessor is initiated with the start signal 110. The microprocessor obtains current samples from the current sensors 80 of the contactor 10 as shown in step 110. For a particular instant in time the current value for I is squared as is shown as step 114. As shown in step 116 this is then multiplied by the time elapsed in taking the sample. This number is then the actual $I^2t$ value indicating the thermal condition of the contactor at that point. The target value for $I^2t$ is then retrieved from memory as shown in step 118. A percentage is then calculated of the actual $I^2t$ compared to the target value as shown in step 120. This percentage is then converted to a suitable bit pattern usable by a display device such as display 100 of FIG. 4. This step is shown in step 122. The information is displayed as shown in step 124 and, as mentioned hereinbefore, the display may be an LED bar type display or a digital display.

In accordance with another aspect of the invention the microcomputer may be additionally suitably programmed to calculate estimated time to trip and estimated time to reset.

It should be understood that the present invention discloses a method and apparatus for remotely displaying the thermal condition or the level of heat in a motor such that an operator can read the display and take action to avoid an overload trip which would result in down time until a reset can be performed. Specifically, the operator could activate the system in a different manner if he or she were aware that the device was close to the trip condition. This is particularly useful in plugging of plug-reversing type duty. The $I^2t$ may displayed on either an LED bar type display or a digital display. In addition, a trip LED and a reset allowed LED could also be provided.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An apparatus for displaying information about heat in a motor having an associated motor controller having a contactor for switching current to the motor, and having means for causing the main contacts of the contactor to open at a predetermined overload condition, comprising:

an overload relay means operatively associated with said motor controller, said overload relay means having means for obtaining raw data representative of current level in said motor;

microprocessing means operatively connected to said overload relay means, said microprocessing means having means for generating an actual signal representative of said heat in said motor using said raw data from said overload relay means, and for generating an output signal based upon a relationship between said actual signal and a predetermined target value; and display means operatively connected to said microprocessing means for receiving said output signal from said microprocessing means and for providing a visual display indication of said output signal.

2. The apparatus of claim 1 wherein said actual signal is generated as current squared multiplied by time, and said target value as the square of a predetermined current value at said predetermined overload condition multiplied by time.

3. The apparatus of claim 2 wherein
said output signal is generated as a percentage signal being said actual signal as a percentage of said target value.

4. The apparatus of claim 3 wherein
said display means also has a trip indicator light responsive to said output signal such that trip indicator light is illuminated when said output signal is a percentage of about one hundred percent.

5. The apparatus of claim 3 wherein said display means also has a reset indicator light responsive to said output signal such that said reset indicator light is illuminated when said output signal reaches a predetermined percentage occurring when said contacts have opened in response to said predetermined overload condition, and said heat in said motor has decreased such that said actual signal correspondingly decreases and said output signal decreases to said predetermined percentage.

6. The apparatus of claim 3 wherein said microprocessing means also includes network interface means for generating said output signal and said display means being positioned in communication with said network interface at a site remote from said motor controller such that said display means remotely provides a visual display indication of said output signal.

* * * * *